US006913278B1

(12) United States Patent
Laska

(10) Patent No.: US 6,913,278 B1
(45) Date of Patent: Jul. 5, 2005

(54) TRAILER COUPLER BUMPER

(76) Inventor: Roger C. Laska, 1529 Sunshine Ct., Chaska, MN (US) 55318

( * ) Notice: Subject to any disclaimer, the term of this patent is extended or adjusted under 35 U.S.C. 154(b) by 0 days.

(21) Appl. No.: 10/658,104

(22) Filed: Sep. 9, 2003

Related U.S. Application Data

(60) Provisional application No. 60/409,375, filed on Sep. 10, 2002.

(51) Int. Cl.[7] ............................................. B60R 21/34
(52) U.S. Cl. ...................................... 280/507; 293/142
(58) Field of Search ........................ 280/507, 511, 504; D12/162; 293/142, 144, 117

(56) References Cited

U.S. PATENT DOCUMENTS

| | | | |
|---|---|---|---|
| 1,881,231 A * | 10/1932 | Jackson ....................... | 293/143 |
| 2,271,046 A * | 1/1942 | Sing ............................ | 293/143 |
| 3,237,969 A | 3/1966 | Geresy | |
| 4,509,770 A | 4/1985 | Young et al. | |
| 4,581,908 A * | 4/1986 | Bulle et al. ..................... | 70/58 |
| 4,940,427 A | 7/1990 | Pearson | |
| 4,955,968 A | 9/1990 | Beckerer | |
| 5,129,828 A | 7/1992 | Bass | |
| 5,380,209 A | 1/1995 | Converse, Jr. | |
| 5,575,494 A | 11/1996 | DeVries | |
| 5,651,559 A | 7/1997 | Liland et al. | |
| 5,681,053 A * | 10/1997 | Misukanis et al. .......... | 280/507 |
| 5,722,854 A | 3/1998 | Geisier | |
| 5,765,848 A | 6/1998 | Silvey | |
| 6,039,339 A * | 3/2000 | Bello ......................... | 280/507 |
| 6,322,094 B1 * | 11/2001 | Poe ............................. | 280/507 |
| 6,412,806 B1 * | 7/2002 | Peacock ..................... | 280/507 |

* cited by examiner

Primary Examiner—Tony Winner

(57) ABSTRACT

A bumper has an elastic body shaped to fit on a conventional trailer coupler to prevent damage to the coupler to a towing vehicle during attachment of the coupler to a ball-type hitch on the vehicle. The body has side flanges with longitudinal grooves for receiving coupler lateral flanges and a transverse strap joined to the side flanges to retain the body on the coupler and prevent removal of the bumper when the coupler is attached to the ball-type hitch.

24 Claims, 17 Drawing Sheets

TRAILER COUPLER BUMPER

CROSS REFERENCE TO RELATED APPLICATION

This application claims the benefit of U.S. Provisional Patent Application Ser. No. 60/409,375 filed Sep. 10, 2002.

FIELD OF THE INVENTION

The invention relates to bumpers for conventional trailer couplers to protect the trailer towing vehicle from damage, such as dents and scratches, during the connecting of a ball hitch on a vehicle to a trailer coupler. The bumper is an impact absorbing resilient cushion having a bulbous shaped body that covers the quad-hemispherical forward end of a trailer coupler. An electric plug receptacle boot in the side of the bumper is adapted to protectably receive the electric plug of a trailer electric light system when the trailer is not in use.

BACKGROUND OF THE INVENTION

Trailer hitch assemblies incorporating a ball on a vehicle and a trailer having a tongue with a bulbous hollow receptacle for receiving such ball on the vehicle are well known. The bulbous receptacle on the tongue of the trailer and associated locking mechanism are generally referred to as the trailer coupler. The structural design of a trailer coupler has become standardized. Geresy (U.S. Pat. No. 3,237,969) discloses the standard trailer coupler design which is fabricated from metal plate material. As depicted by Geresy, the standard design includes a bulbous hollow for receiving the ball on a vehicle for connection thereto. Further, the wall of the bulbous hollow continues around the front and sides on the bottom side of the coupler to form a lateral marginal flange which extends beyond the bulbous hollow to form the perimeter of the trailer coupler.

The conventional trailer coupler can cause extensive damage to a vehicle when backing up to a trailer coupler for connecting a trailer to that particular vehicle. For example, when a vehicle is being backed up to a trailer, the operator of the vehicle cannot see the trailer coupler which is obscured by the vehicle. Thus, unless the operator always has an additional person giving direction, the operator must guess the distance to backup. This many times leads to contact between the trailer coupler and the back of the vehicle. This contact causes damage to paint on the vehicle, bumper and/or license plate on many occasions. This problem is further complicated by the operator having to guess the appropriate height of the coupler prior to backing under the trailer. The proper height can vary with the grade on which the vehicle and trailer are positioned. Thus, improper height can lead to contact between the standard trailer coupler and readily damaged portions of the vehicle, such as the vehicle bumper, tail gate, license plate, trunk lid or plastic lighting covers.

Although some trailer hitch bumpers have been developed, only one has been developed to date to protect against metal-to-metal contact between the trailer coupler and the vehicle when backing underneath the trailer coupler for connection with the vehicle.

DeVries in U.S. Pat. No. 5,575,494 discloses a guard for a trailer coupler having a generally U-shaped member that protects against damage from metal to metal contact between only the lateral marginal flange of the trailer and the vehicle.

Liland et al in U.S. Pat. No. 5,651,559 discloses a protective guard for a trailer hitch housing having an impact absorbing body covering at least a portion of the outer surface of the longitudinal end portion of a trailer hitch housing. It is possible that this guard could fall off, as its primary means of attachment is an adhesive disposed between the guard body and the outer surface of the coupler. If the guard does fall off, it has no means of retention. This design also has no provisions for a plug receptacle boot for protectably receiving a trailer lighting plug.

Young et al in U.S. Pat. No. 4,509,770 discloses a decorative cover for the end of a draw bar and a towing hitch cover which protects the draw bar when the draw bar is not in place. This design does not address the problems associated with contact between the coupler of the trailer, but rather the vehicle portion of the hitch assembly.

Beckerer, Jr. in U.S. Pat. No. 4,995,968 discloses a protective cover for a trailer hitch which fits over the ball of the trailer. The cover is designed to protect operators from injury when they hit their leg on the ball on the vehicle when a trailer is not attached thereto. The design could be not utilized to protect against damage associated with the frontal portion of the coupler contacting the vehicle when being attached thereto.

Silver in U.S. Pat. No. 5,765,848 discloses a trailer accessory for protectably receiving trailer plugs. The base is secured to the tongue with a connection member including threaded fasteners which engage first and second end slots of a crossbar and first and second inboard slots of the base. This design could not be utilized to protect against damage associated with the frontal portion of the coupler contacting the vehicle when being attached thereto. The design cannot be utilized to protect against damage associated with the frontal portion of the coupler contacting the vehicle when being attached thereto.

Geisler in U.S. Pat. No. 5,722,854 discloses a protective covering system for trailer light connectors. The protective covering system is characterized by a body, a cap, and an optional holder. The body has a lower flexible portion with a slit for easily attaching and detaching the trailer light protective covering system to the trailer. In the preferred embodiment, the lower part of the flexible body has a slit that allows the device to be easily attached and detached from the wiring harness. In other embodiments, the system is attached to the trailer or towing vehicle in a number of places and in a number of ways. The design could not be utilized to protect against damage associated with the frontal portion of the coupler contacting the vehicle when being attached thereto.

U.S. Pat. No. 4,940,427, dated Jul. 10, 1990, to Linnea H. Pearson, details an "Electrical Trailer Connector Retainer." The retainer is designed for use with an electrical wire connector of the type commonly used to provide electrical connection to a trailer device from the electrical system of a towing vehicle. The device is permanently mounted either on the bumper of the towing vehicle or the tongue of the trailer and permits the electrical wire connector used for transferring electrical power to the trailer from the electrical supply system of the towing vehicle, to be retained when not in use and to be made available for electrical connection when needed. While this device prevents the connector from dragging on the ground, it does not protect the connector from rain, mud, snow, dust and other environmental hazards. This device is permanently fixed directly to the towing vehicle or to the trailer itself, and is not easily removable or relocatable.

U.S. Pat. No. 5,129,828 dated Jul. 14, 1992, to Chaunice L. Bass, details a rewind trailer light connector which includes a rewind housing connected to a vehicle frame or trailer tongue and fitted with a spring-loaded rewind mechanism for storing electrical wiring and the connector or connector receptacle. While this device can provide some protection for the wiring, it does little to protect the actual receptacle from exposure to adverse elements and is also fairly complicated, having numerous moving parts, and is relatively expensive. It also is mounted directly to the towing vehicle or to the trailer itself. This device, therefore, is also not easily removable or relocatable. Furthermore, the rewind mechanism itself is exposed to the elements, causing it to fail, negating its protective properties.

U.S. Pat. No. 5,380,209 dated to Jan. 10, 1995, to Carroll H. Converse, Jr. (the '209 patent), details a trailer light connector enclosure which discloses a box-like enclosure for containing a trailer light connector and the attached wiring which allows both the trailer connector and wiring to be protected. However, the protective device taught by the '209 patent, like the others detailed above, requires a permanent or semi-permanent attachment to the vehicle or trailer. The '209 device is not easily removed once installed or easily relocated to another trailer and may necessitate the purchase of several devices, one for each trailer or vehicle. In addition, one preferred embodiment taught by the '209 patent is secured to the towing vehicle or the trailer by an adhesive strip. This type of adhesive strip may be prone to failure after extended periods of time and exposure to water and other adverse environmental conditions.

The need exists for a trailer coupler bumper which protects against damage from metal-to-metal contact or metal-to-vehicle contact between any part of the frontal portion of the trailer tongue coupler not only the lateral marginal flange.

SUMMARY OF THE INVENTION

The invention is a bumper for a trailer coupler which prevents or reduces damage due to contact between the trailer coupler and vehicle when the vehicle is being connected to a trailer via the coupler. The bumper is designed to be used in conjunction with standard 1⅞- and 2-inch trailer couplers, the design of which has become standardized. The standardized design of a trailer coupler includes a bulbous hollow having a side wall which angles from a generally vertical direction to a horizontal direction to form a lateral marginal flange extending beyond the perimeter of the vertical wall of the bulbous hollow. The front of the trailer coupler is the portion of the coupler which contacts a vehicle when backed under the coupler. The bumper is specifically designed to fit over the frontal portion of the trailer coupler to provide a cushion between the vehicle and the trailer coupler and thus, prevent damage to the vehicle when the vehicle bumps the trailer protected with the bumper. The bumper has one or more plug receptacle boots for protectably receiving one or more standard styles of trailer lighting plugs and braking electrical connectors.

The bumper has a semi-hemispherical shaped body having a convex curved front portion joined to rearwardly directed side portions. The body has a concave inside wall around a pocket having a size and shape to engage the outer surface of the bulbous portion of a conventional trailer coupler. Side flanges are joined to lower portions of the side walls. The side flanges project outwardly from the side walls and extend rearwardly from the front portion of the body. Each side flange has a linear longitudinal groove having an inside opening adapted to accommodate a side flange of the trailer coupler. The front portion of the body does not have a flange that extends over the curved front flange of the trailer coupler. The forward part or nose of the front portion of the body projects forwardly of the front flange. The side portions of the body have inwardly and rearwardly inclined inside walls adapted to engage opposite sides of the trailer coupler. A transverse elastic band or strap joined to the rear ends of the flanges biases the side portions toward each other to firmly retain the body on the trailer coupler. The strap also prevents the bumper from separating from the trailer coupler when attached to a ball-type hitch on a vehicle. The band does not impede the functioning of the latching foot of the trailer coupler. The body, side flanges, and band are a one-piece elastomeric material, such as polyurethane or rubber member.

Boots having inside pockets are joined to the outside of the side portions of the body. Each pocket has a lower opening to allow an electric plug to be placed in the pocket. One boot has a generally rectangular pocket to accommodate a conventional flat plug connected to the electric wires leading to the tail and brake lights of the trailer. The other boot has a cylindrical pocket to accommodate a tubular RV electric plug or connector. One alternative embodiment of the body has only the boot with the rectangular pocket. Another embodiment of the body has side portions without boots for holding electric plugs.

The bumper addresses the problems associated with contact and subsequent damage due to contact between the frontal portion of the trailer coupler and the intended towing vehicle. The bumper prevents this contact by fully covering the generally bulbous shape member of the ball receiver of the trailer coupler as well as enclosing its side lateral marginal flanges.

The bumper has a larger surface area in which to distribute the energy and stresses of the impact, as it covers the whole frontal surface of the trailer coupler. This reduces the chance of damage to the intended towing vehicle and extends the life of the bumper by removing the bulk of the stress from the portion of the bumper covering the lateral flange, and distributing it over the whole front surface of the trailer coupler.

The bumper is easily installed by the consumer or trailer owner. It is positioned so the open back end of the bumper is aligned with the front of the trailer coupler, then it is pushed over the trailer coupler until the front of trailer coupler impacts the inner wall of the mating portion of the bumper.

The bumper does rely on frictional fit, but has a strap that acts as a tether while the trailer is hitched over the ball of the towing vehicle. The strap prevents the bumper from becoming separated from the trailer coupler. The strap also creates another area of capture due to friction fit, thus creating two separate zones of friction fit. Having the strap eliminates the need for the user to remove the bumper at any time.

DETAILED DESCRIPTION OF THE PREFERRED EMBODIMENTS

Detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one of skill in the art to variously practice the invention.

Figure 1:
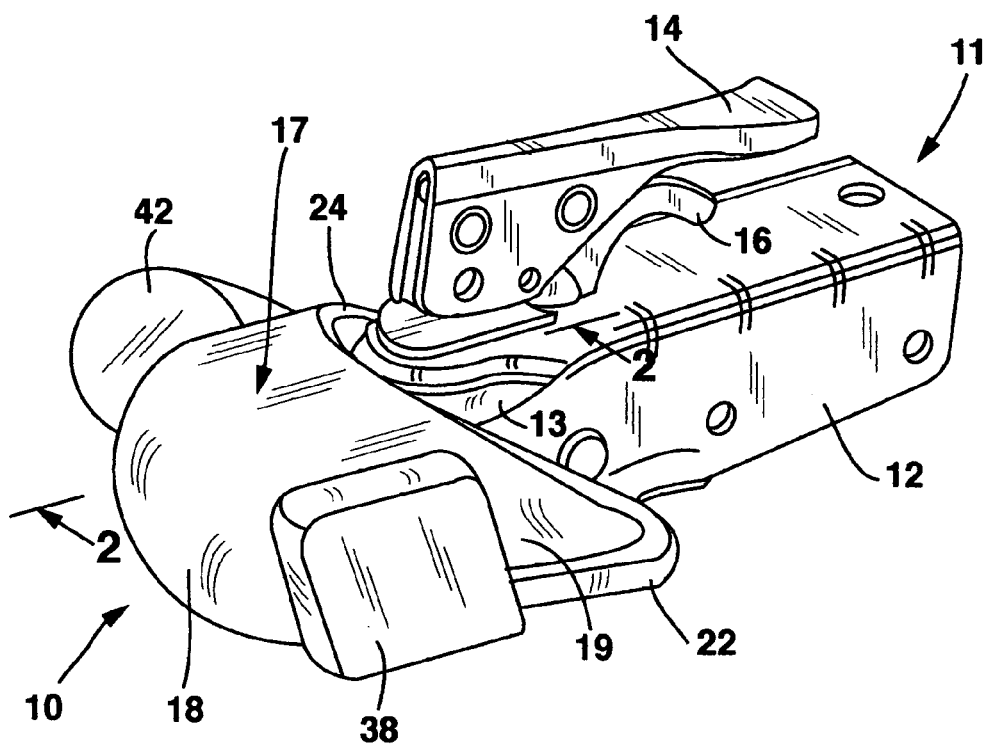
FIG. 1 is a perspective view of a trailer coupler bumper of the invention mounted on a conventional ball-type trailer coupler.
Figure 2:
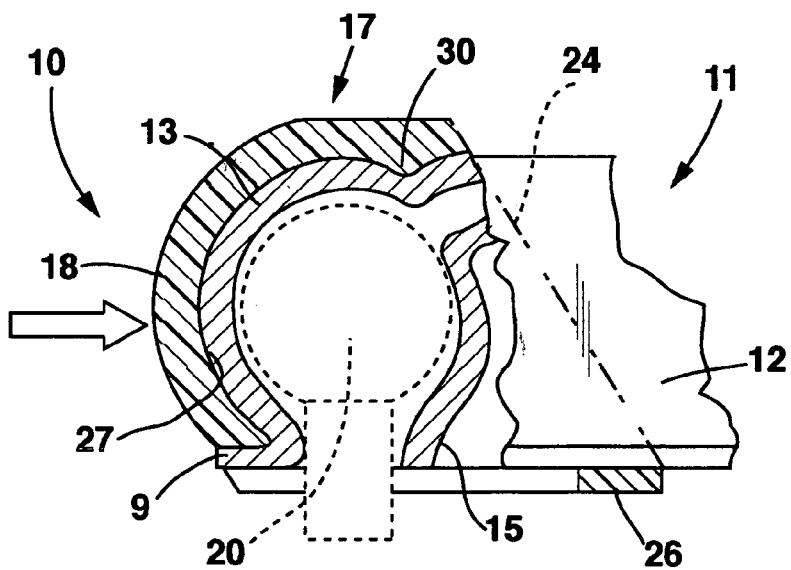
FIG. 2 is a sectional view taken along line 2—2 of FIG. 1.
Figure 3:
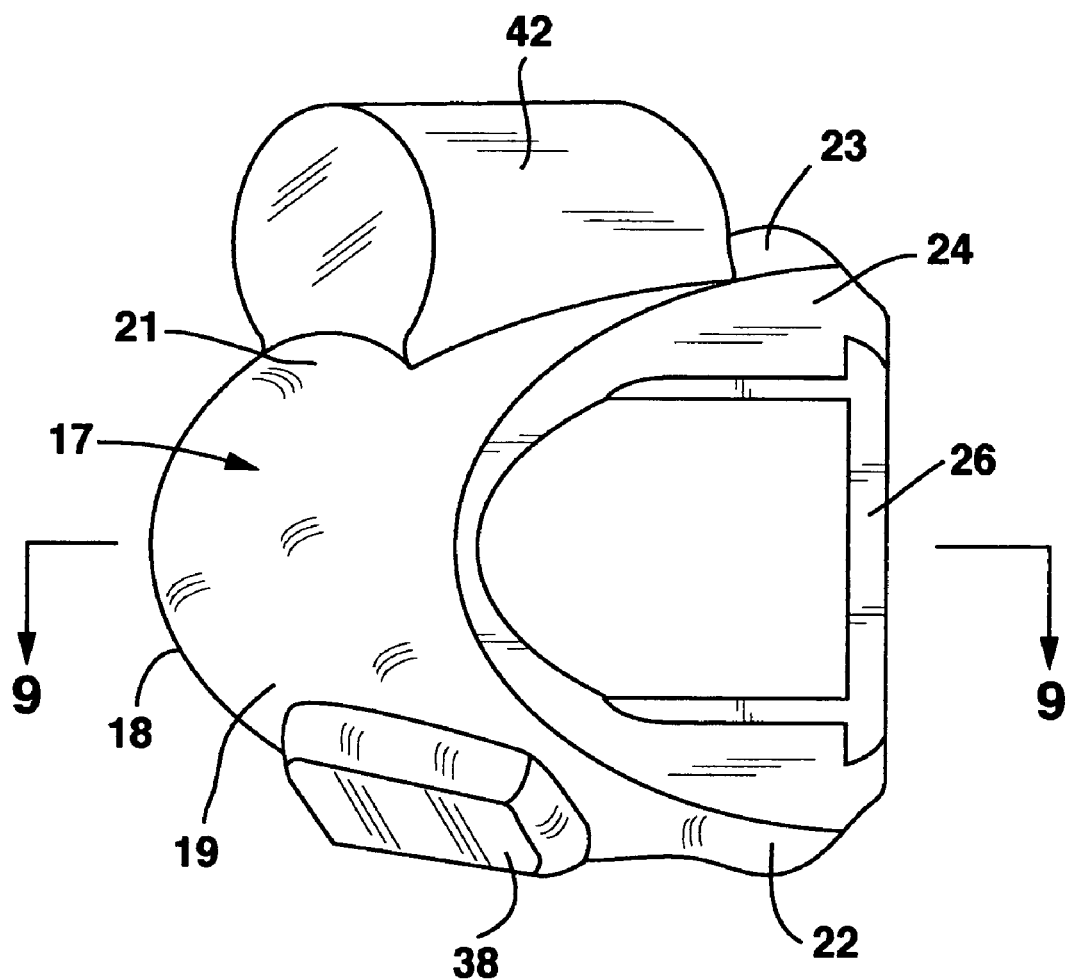
FIG. 3 is a top plan view of the bumper of FIG. 1.
Figure 4:
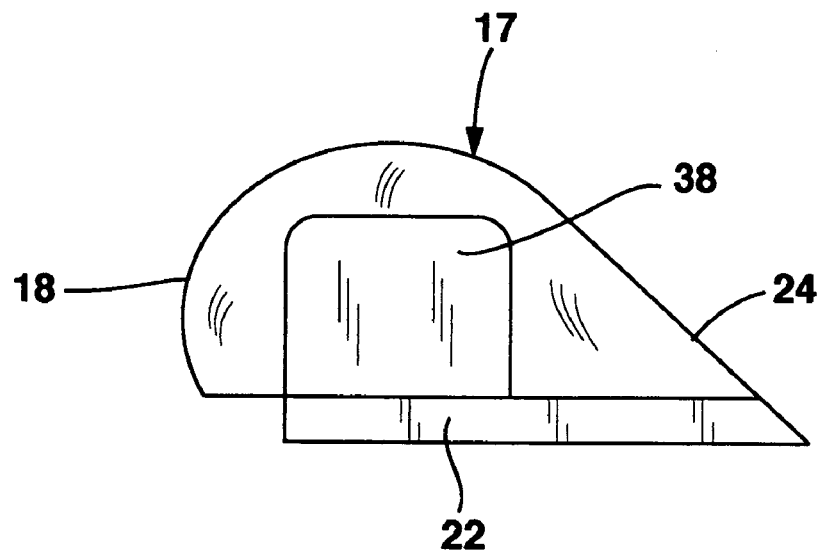
FIG. 4 is a side elevational view of left side of the bumper shown in FIG. 1.
Figure 5:
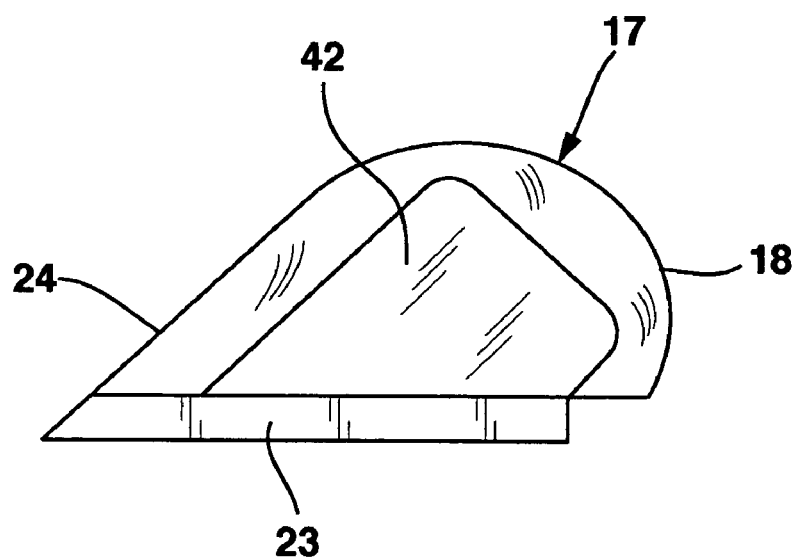
FIG. 5 is a side elevational view of the right side of the bumper shown in FIG. 1.
Figure 6:
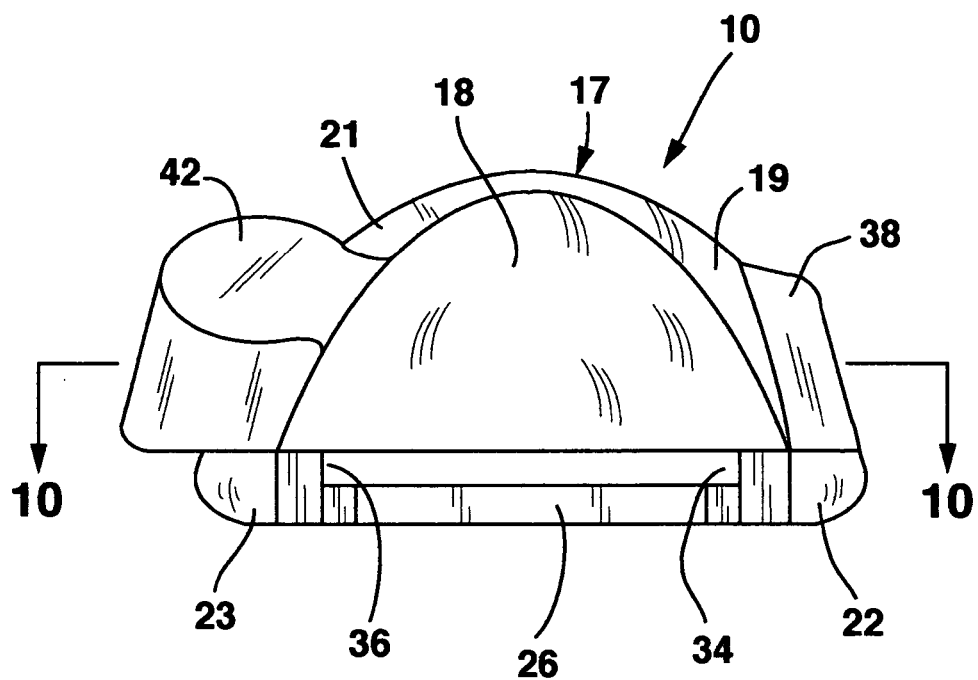
FIG. 6 is a front elevational view of the bumper of FIG. 1.

As shown in FIGS. 1, 2 and 3, a bumper 10 mounted on the front portion of a conventional ball-type trailer coupler 11 is used to reduce impact damage to a towing vehicle when the coupler is being attached to a ball-type hitch on the towing vehicle. Coupler 11 has a channel shaped housing 11 joined to a quad-hemispherical front end 13. Housing 11 and 13 has a continuous outwardly directed lateral flange 9 reinforcing the bottom portions of the housing 11 and front end 13. Flange 9, shown in FIG. 2, projects in a forward direction and can contact a bumper of a towing vehicle and thereby damage the bumper. A lever 14 connected to a locking foot 15 mounted on housing 12 holds foot 15 in retaining relation with the ball 20 of a ball-type hitch. A latch 16 pivotally mounted on lever 14 holds the lever 14 in a lock position. Trailer couplers are conventional devices used with 1⅞- and 2-inch ball sizes.

Bumper 10 has a body 17 that fits on conventional ball-type trailer couplers. Body 17 has a front convex curved front portion 18 joined to rearwardly directed side portions 19 and 21. Outwardly directed lateral horizontal flanges 22 and 23 are joined to side portions 19 and 21. The front portion does not have a lateral flange. As shown in FIG. 2, front portion 18 extends forward of flange 9 of coupler 11 so as to absorb impact forces applied to bumper 10 and coupler 11. Body 17 has a rearwardly and downwardly inclined back wall 24 and a transverse strap or band 26 connected to rear portions of the flanges 22 and 23, as shown in FIGS. 3, 6, 7, 8 and 18. Strap 26 is an elastic member that biases the bumper on housing 11 and front end 13 of coupler 11. As seen in FIG. 2, strap 26 is behind ball 20 whereby bumper 11 cannot be removed from coupler 11 when it is connected to ball 20.

Figure 7:
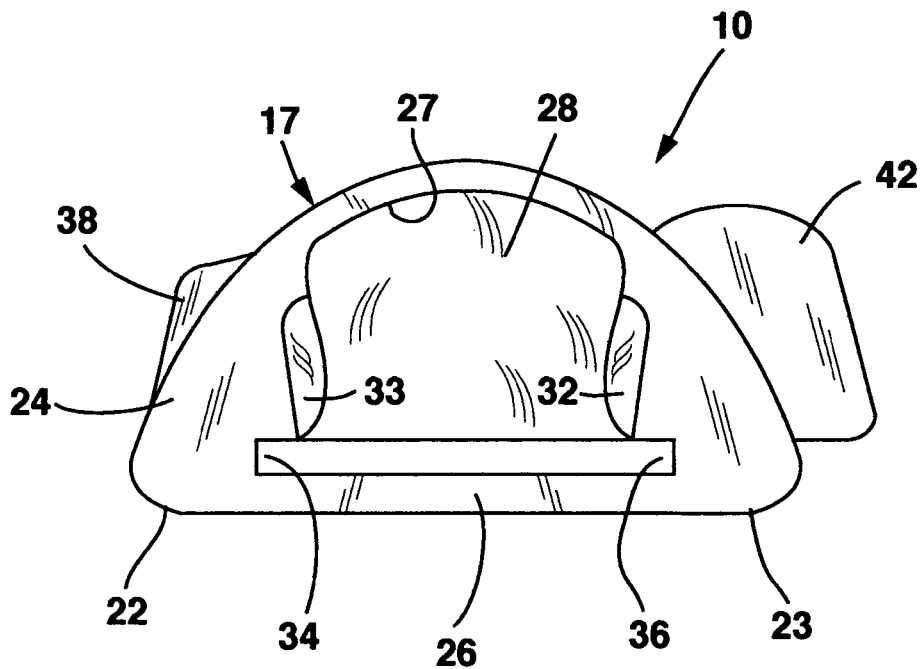
FIG. 7 is a rear elevational view of the bumper of FIG. 1.
Figure 8:
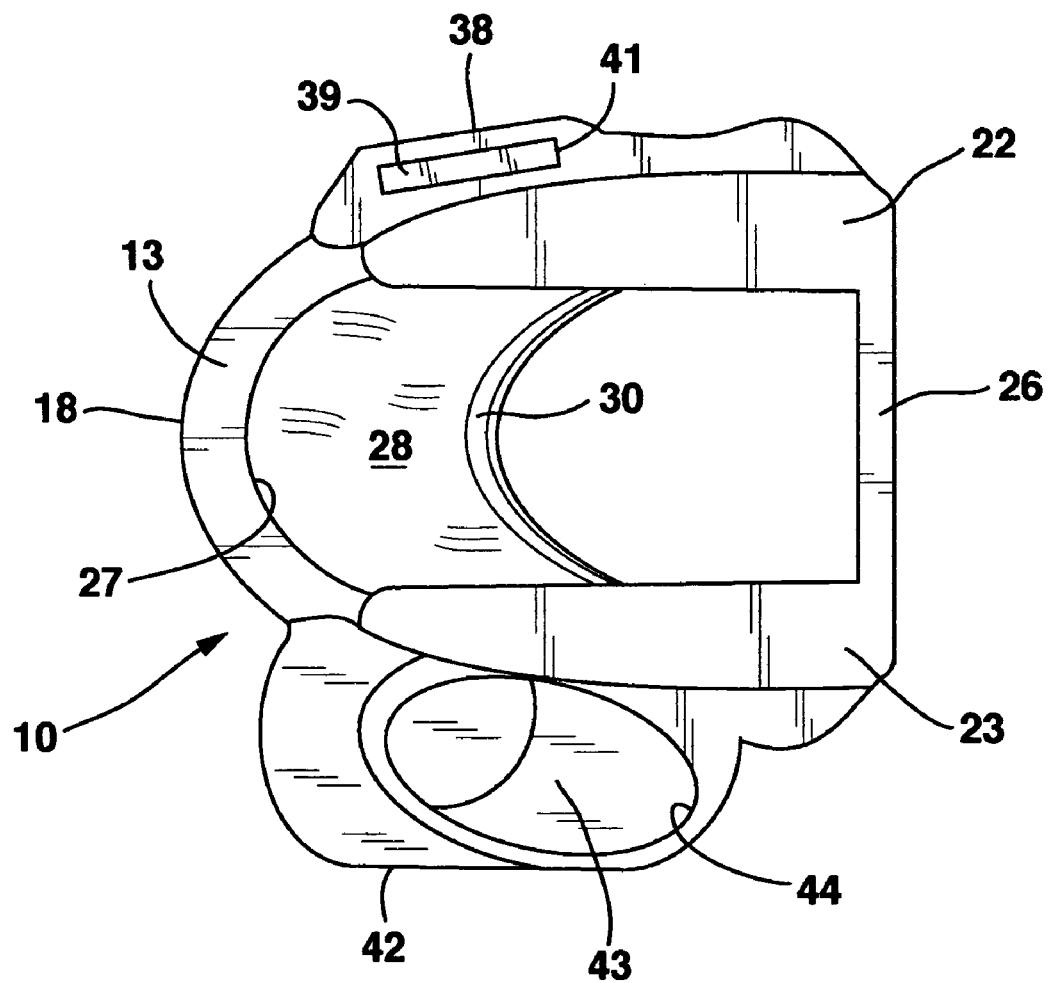
FIG. 8 is a bottom plan view of the bumper of FIG. 1.
Figure 9:
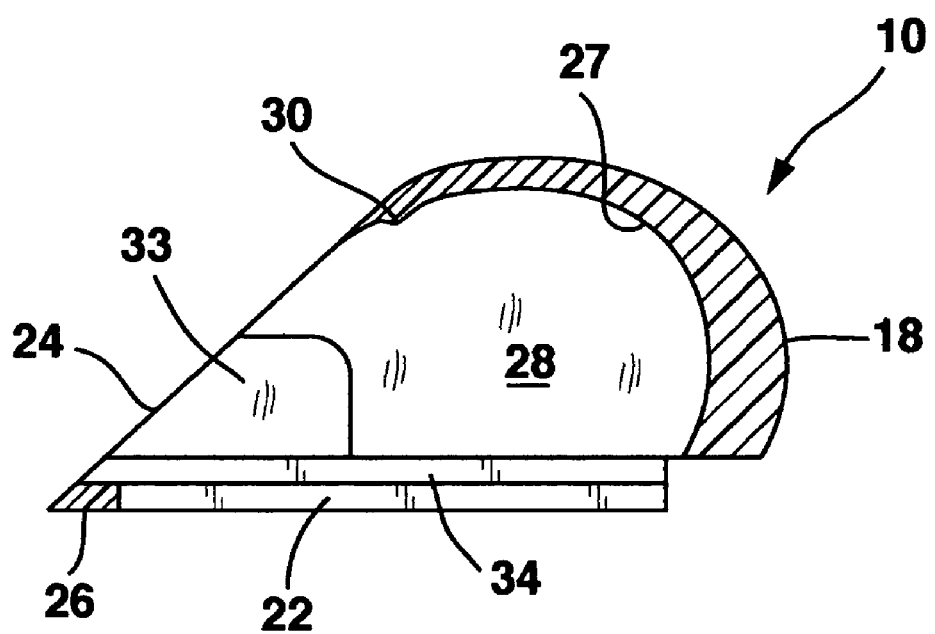
FIG. 9 is a sectional view taken along line 9—9 of FIG. 3.
Figure 10:
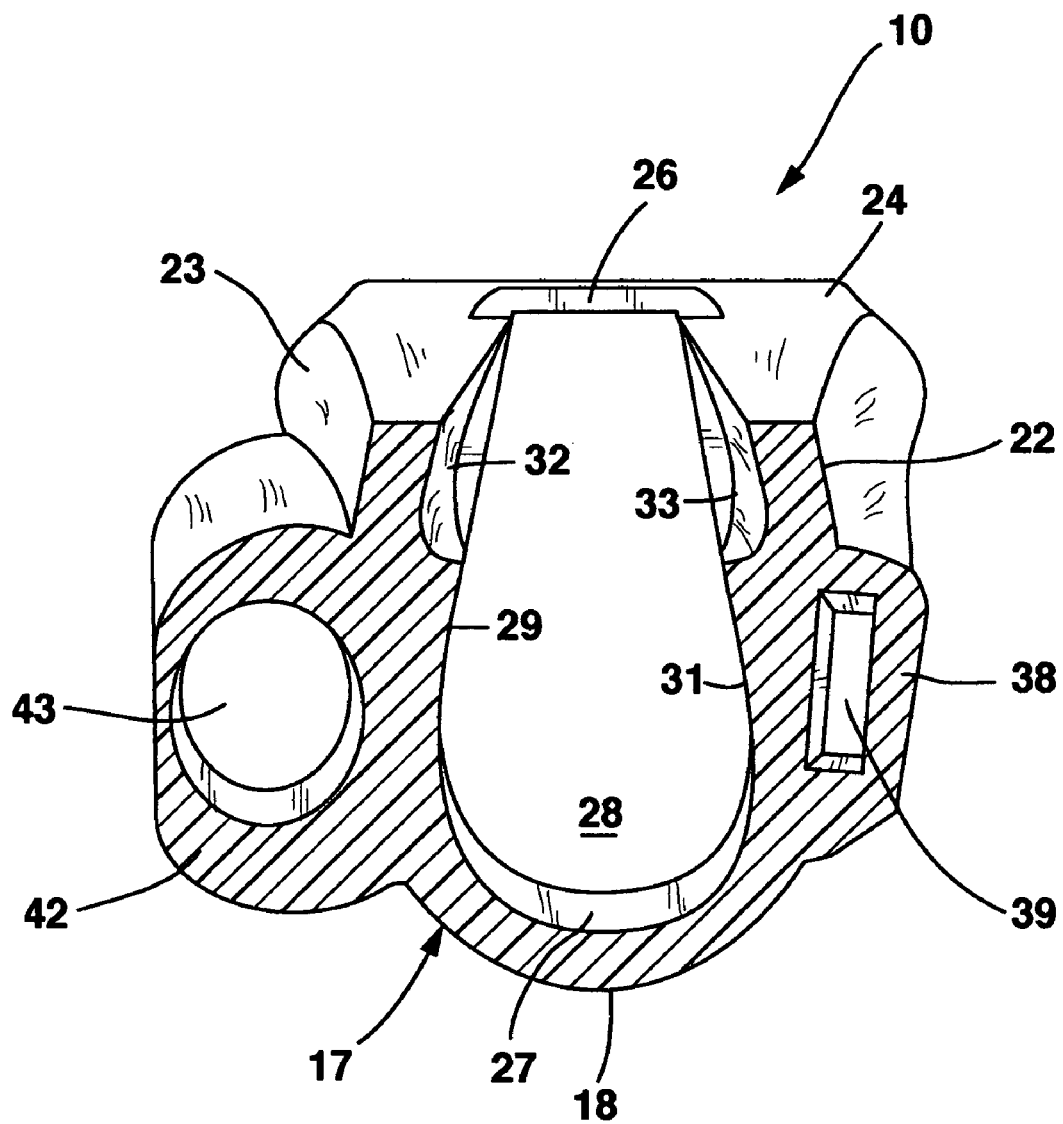
FIG. 10 is a sectional view taken along line 10—10 of FIG. 6.
Figure 11:
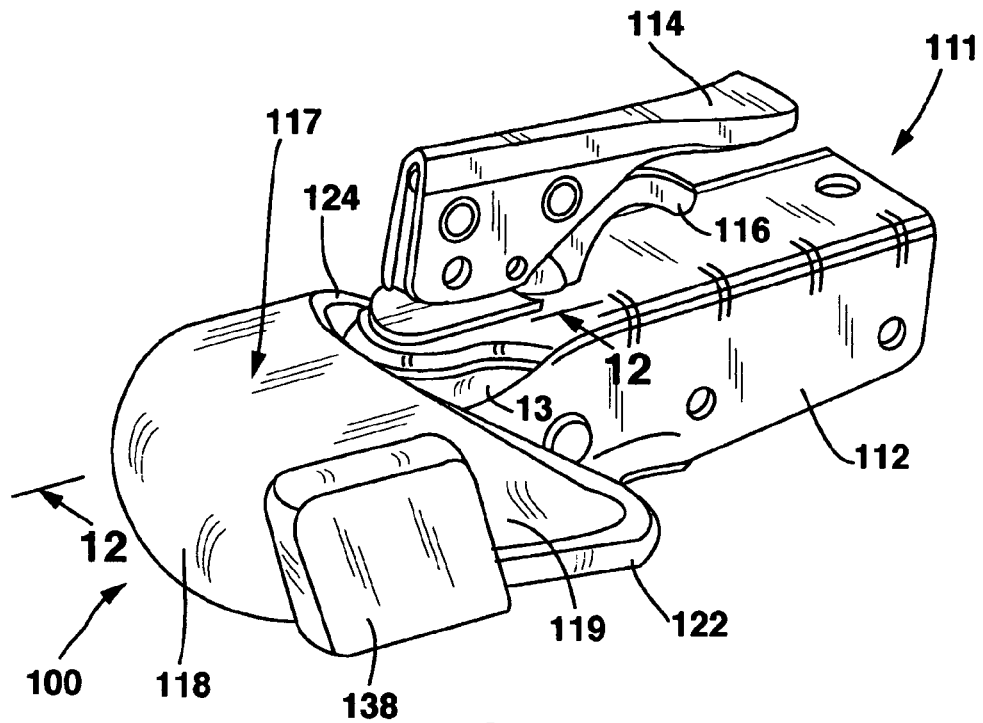
FIG. 11 is a perspective view of a first modification of the trailer coupler bumper of FIG. 1 mounted on a conventional ball-type trailer coupler.
Figure 12:
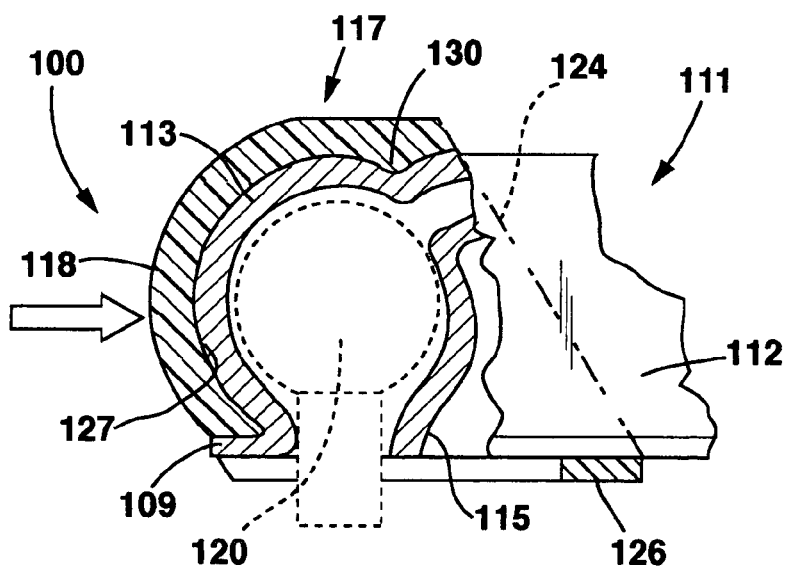
FIG. 12 is a sectional view taken along line 12—12 of FIG. 11.
Figure 13:
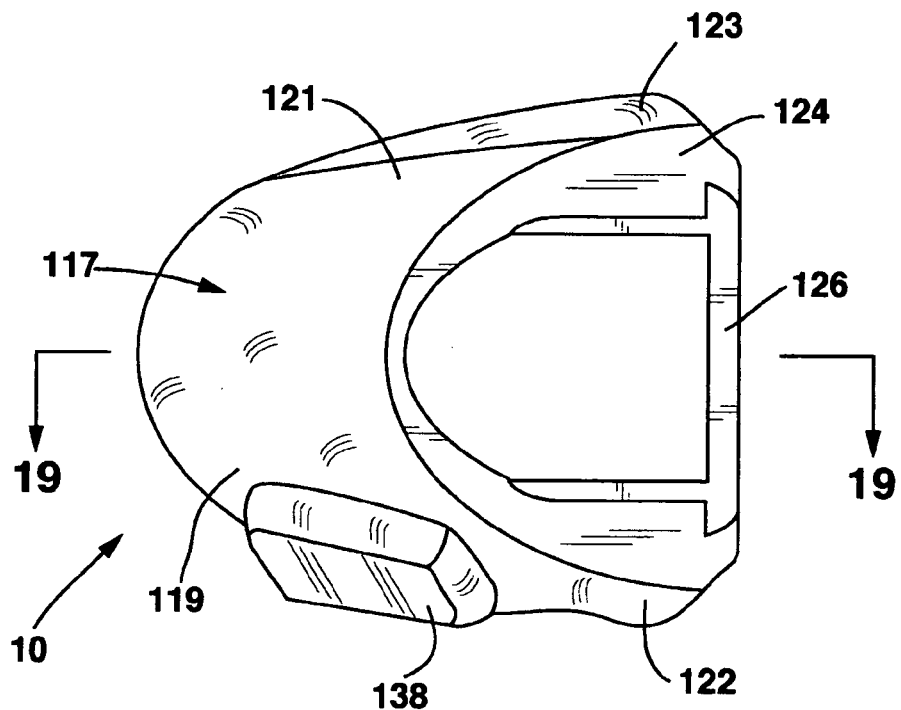
FIG. 13 is a top plan view of the bumper of FIG. 11.
Figure 14:
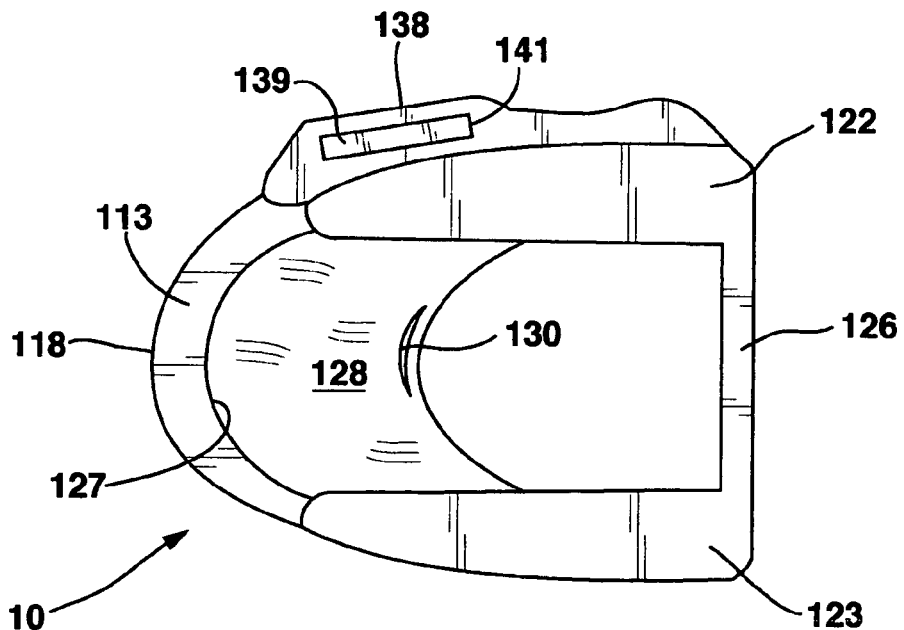
FIG. 14 is a bottom plan view of the bumper of FIG. 11.
Figure 15:
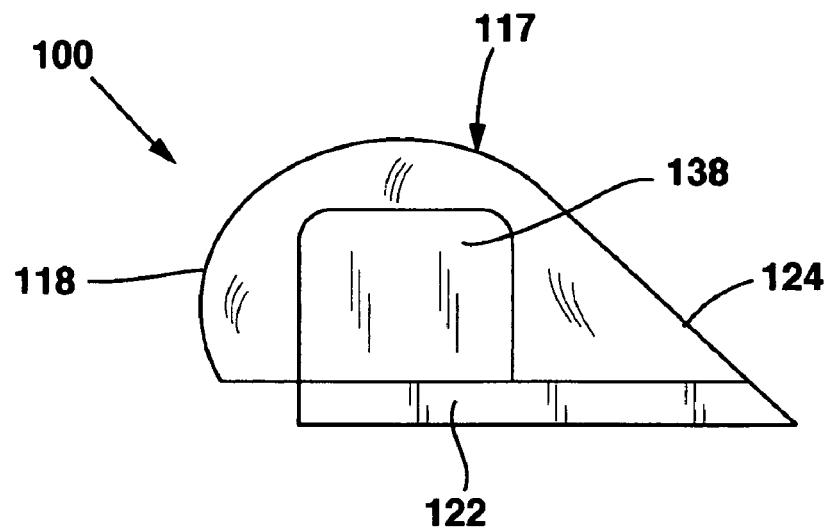
FIG. 15 is a side elevational view of the left side of the bumper of FIG. 11.
Figure 16:
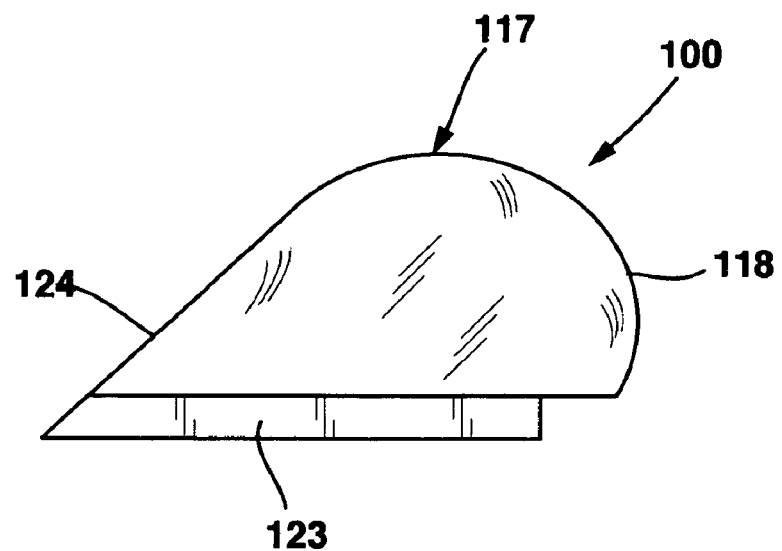
FIG. 16 is a side elevational view of the right side of the bumper of FIG. 11.
Figure 17:
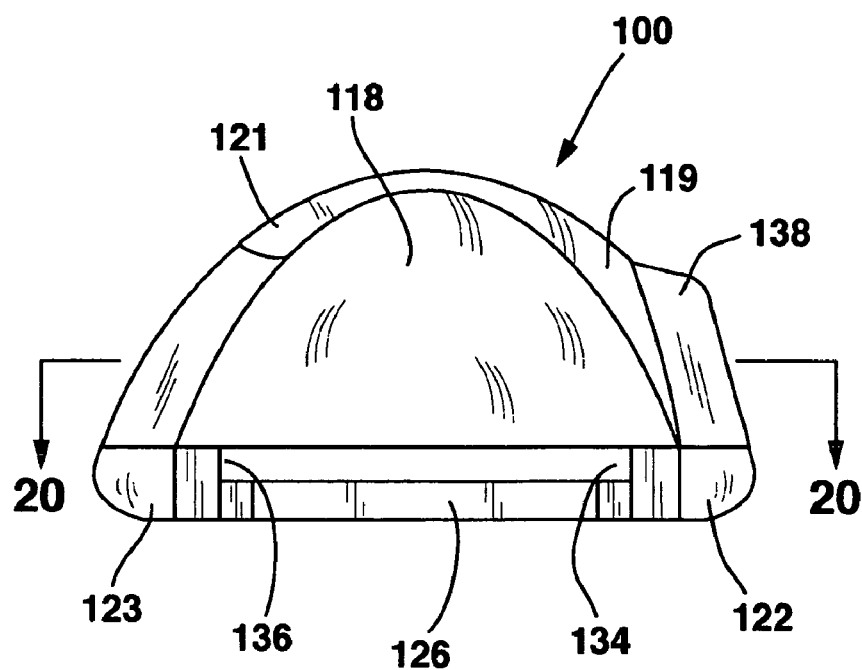
FIG. 17 is a front elevational view of the bumper of FIG. 11.
Figure 18:
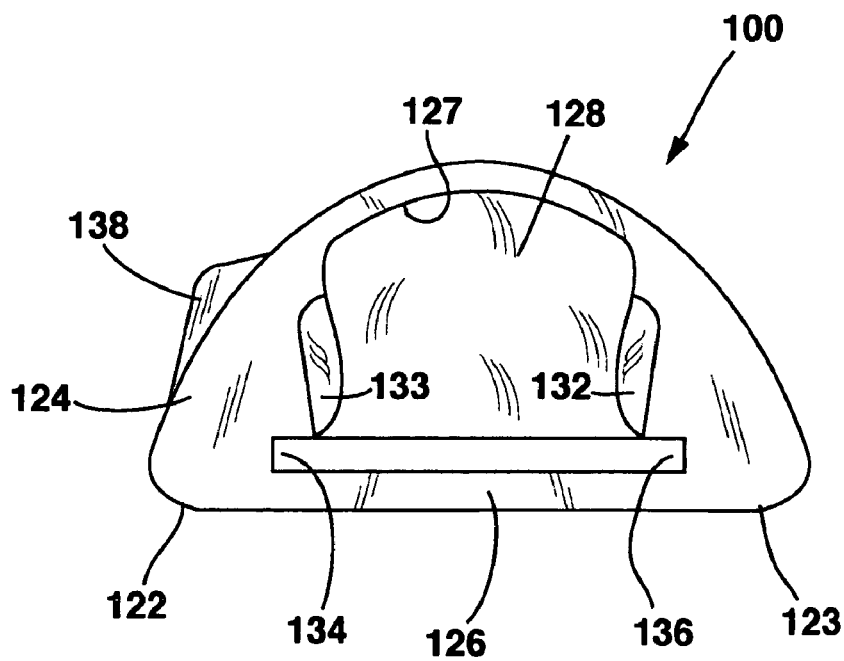
FIG. 18 is a rear elevational view of the bumper of FIG. 11.
Figure 19:
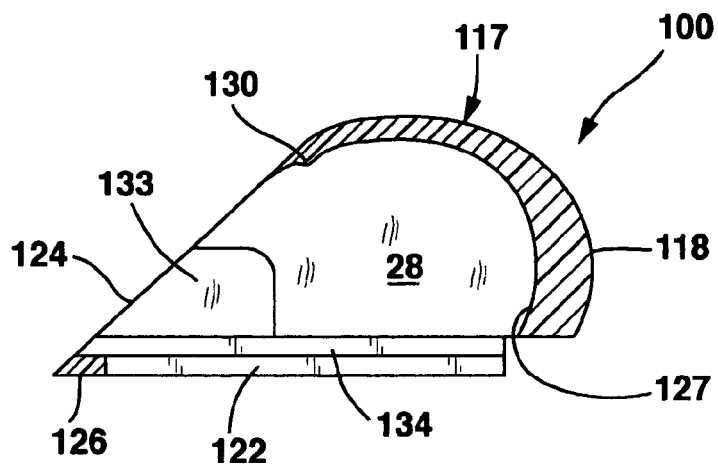
FIG. 19 is a sectional view taken along line 19—19 of FIG. 13.
Figure 20:
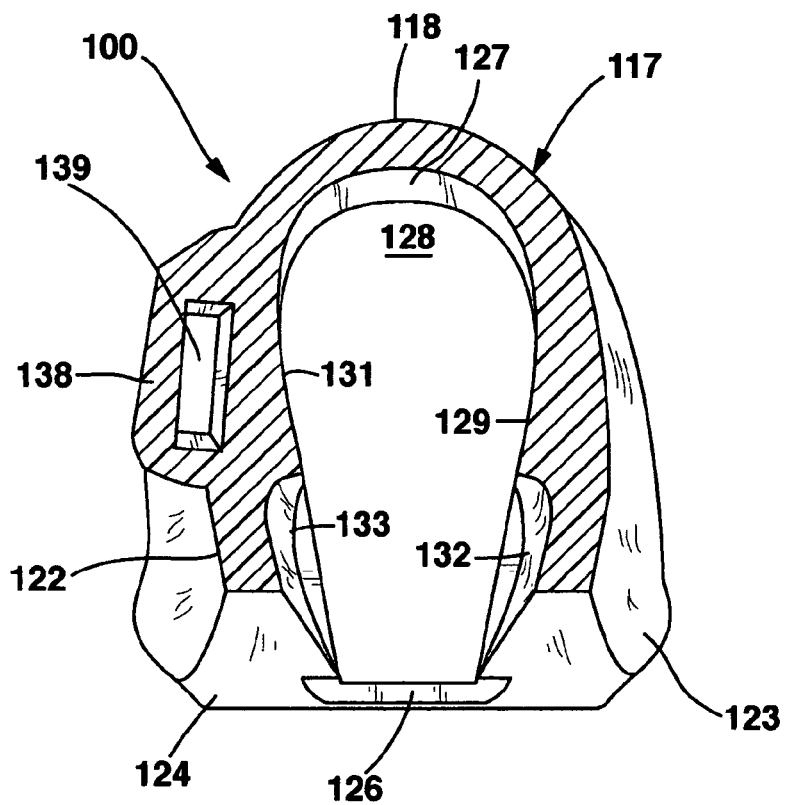
FIG. 20 is a sectional view taken along line 20—20 of FIG. 17.
Figure 21:
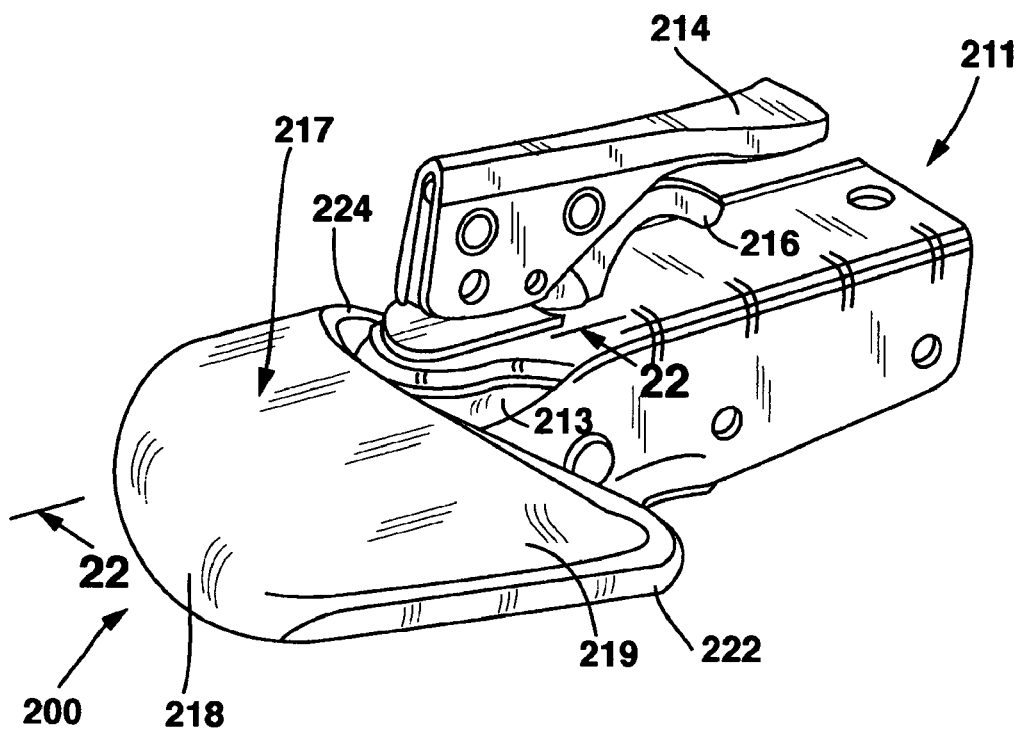
FIG. 21 is a perspective view of a second modification of the trailer coupler of FIG. 1 mounted on a conventional ball-type trailer coupler.
Figure 22:
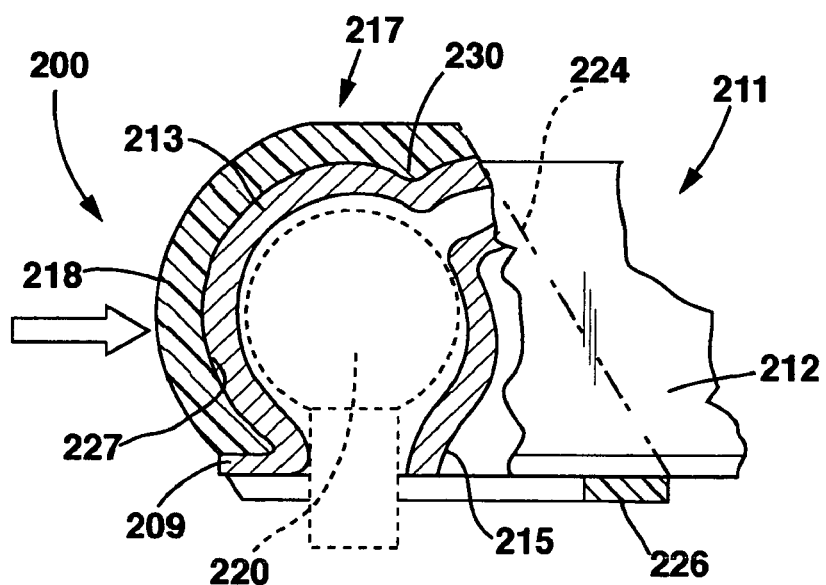
FIG. 22 is a sectional view taken along line 22—22 of FIG. 21.
Figure 23:
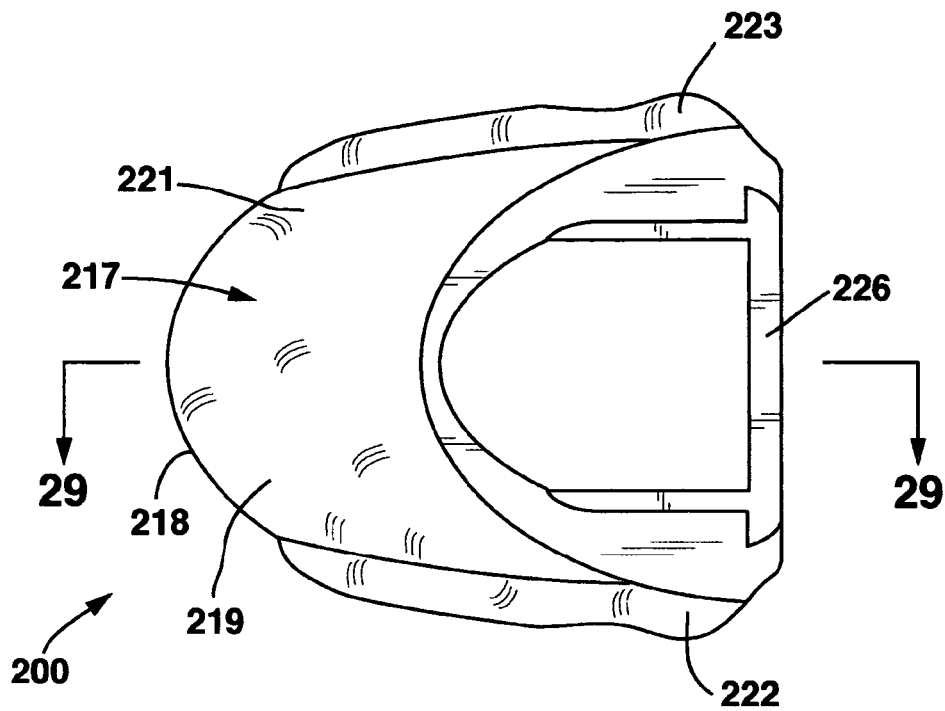
FIG. 23 is a top plan view of the bumper of FIG. 21.
Figure 24:
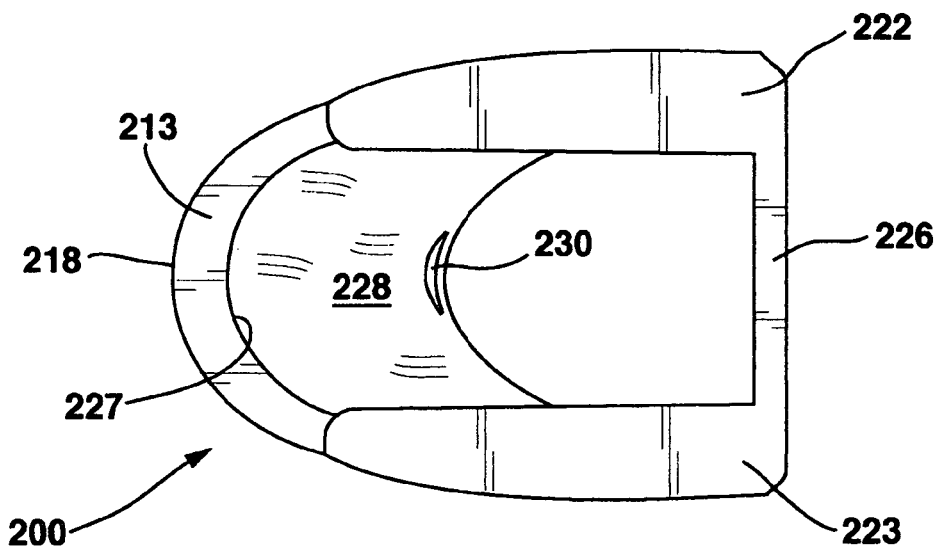
FIG. 24 is a bottom plan view of the bumper of FIG. 21.
Figure 25:
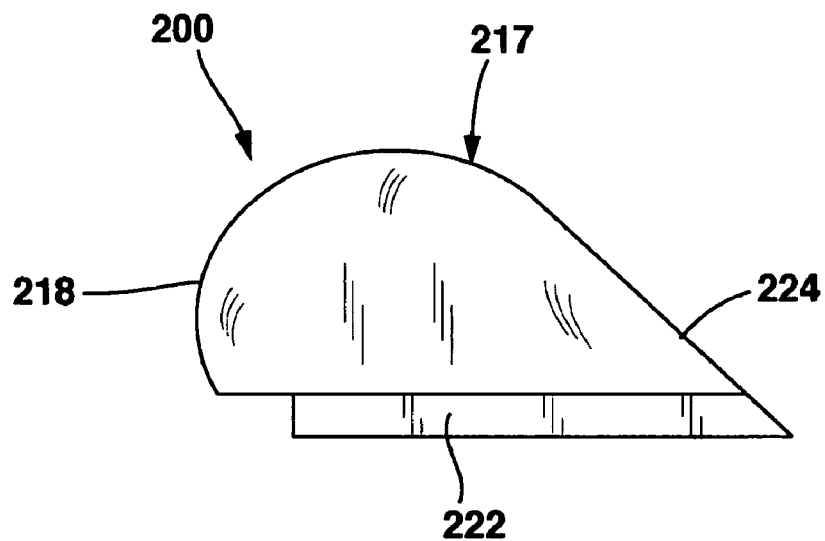
FIG. 25 is a side elevational view of the left side of the bumper of FIG. 21.
Figure 26:
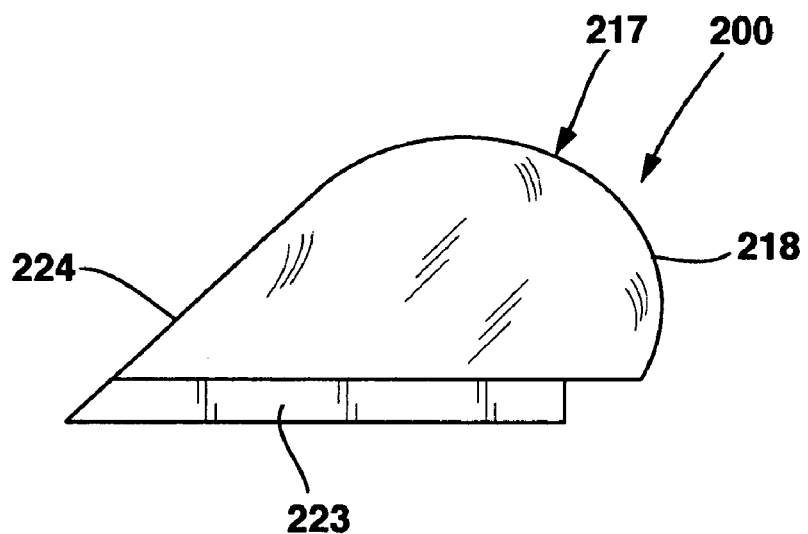
FIG. 26 is a side elevational view of the right side of the bumper of FIG. 21.
Figure 27:
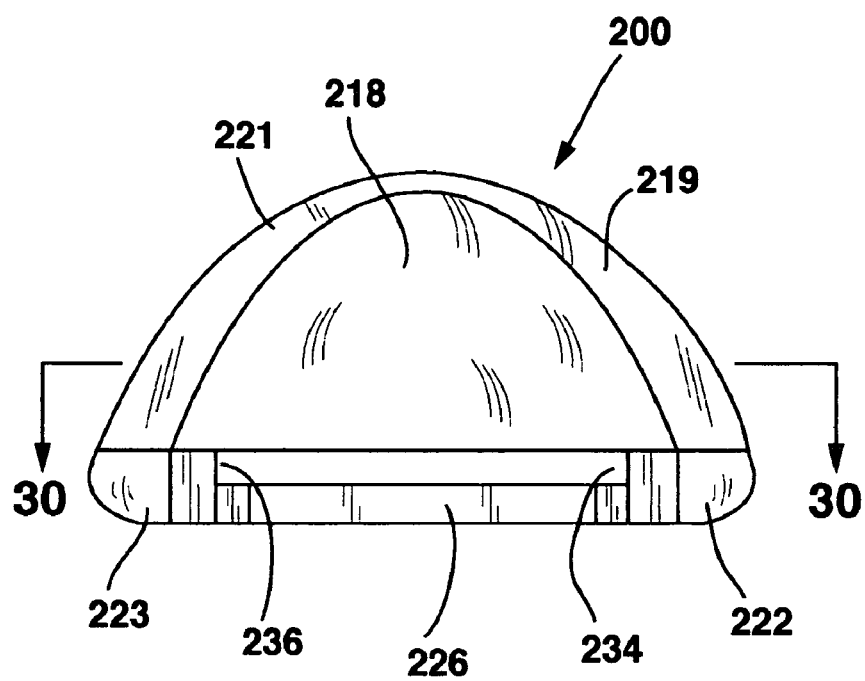
FIG. 27 is a front elevational view of the bumper of FIG. 21.
Figure 28:
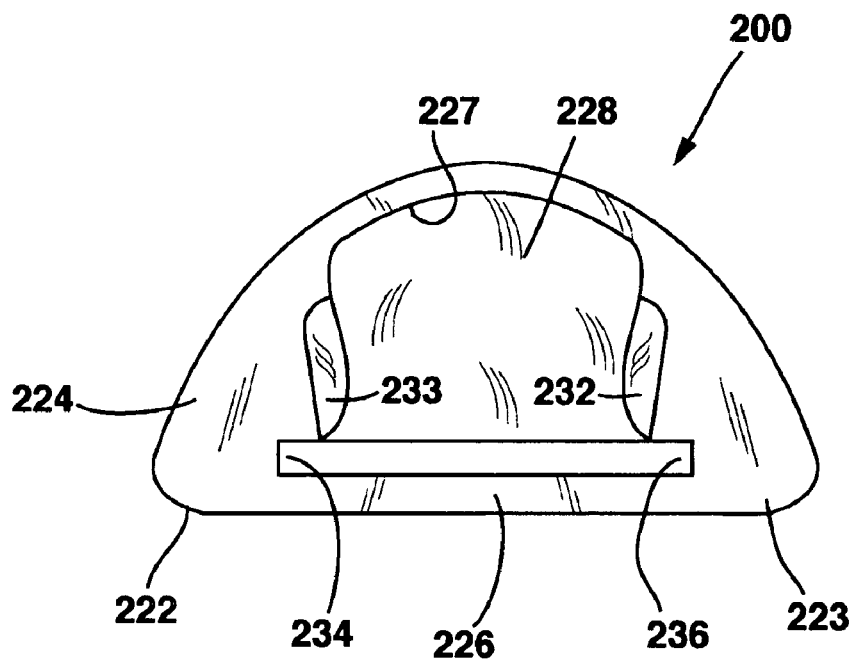
FIG. 28 is a rear elevational view of the bumper of FIG. 21.
Figure 29:
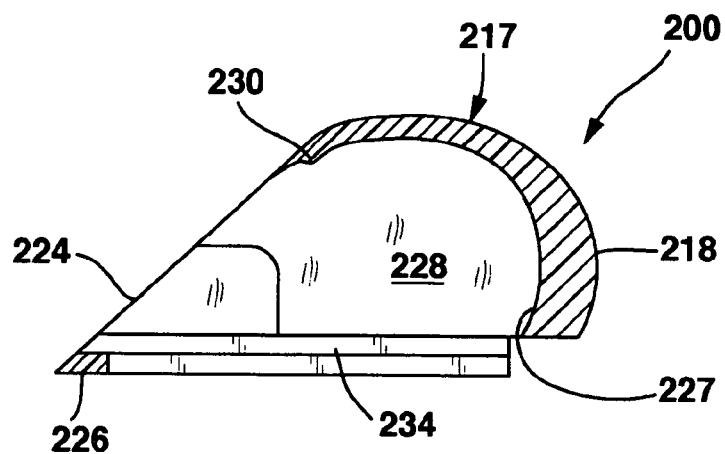
FIG. 29 is a sectional view taken along line 29—29 of FIG. 23.
Figure 30:
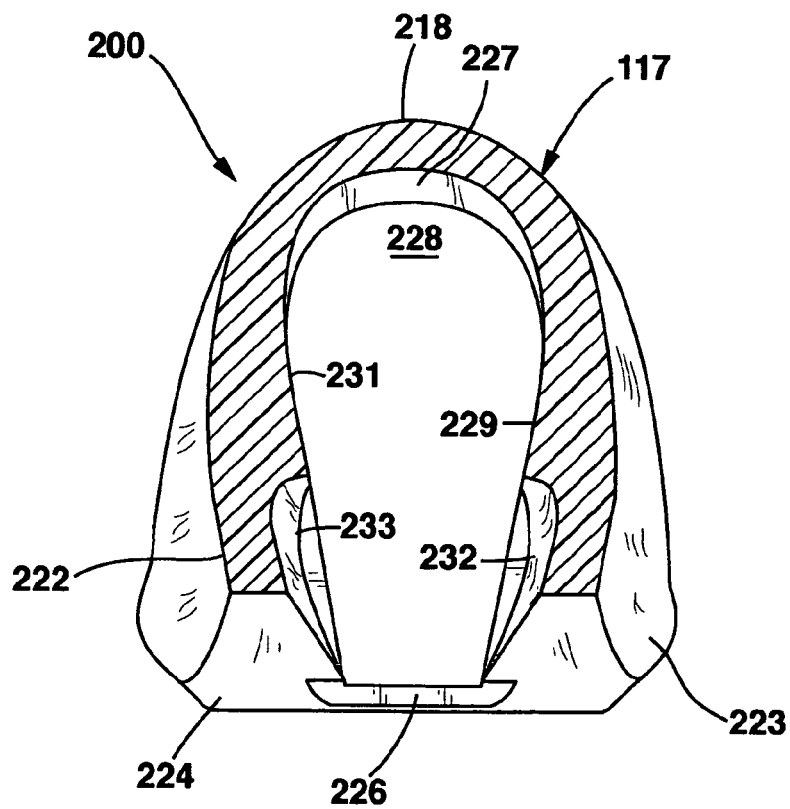
FIG. 30 is a sectional view taken along line 30—30 of FIG. 27.

Front portion 18 of body 17 has a concave inside wall 27 surrounding a pocket 28, shown in FIGS. 7, 8, 9 and 10, for generally the quad-hemispherical end 13 of coupler 11. Wall 27 has a curved shape that is complementary to the curved shape of end 13. The top of wall 27 has a transverse projection or rib 30 that extends into a top recess in coupler 11. Side portions 19 and 21 of body 17 has inside walls 29 and 31, shown in FIG. 10, adapted to engage the side walls of channel member 12 and sides of front portion 13 of coupler 11. Strap 26 retains inside walls 29 and 31 in firm engagement with channel member 12 and front portion 13. As shown in FIGS. 7 and 10, the rear sections of inside walls 29 and 31 have recesses 32 and 33 to accommodate the heads of the pivot pin for the ball locking foot 15. Returning to FIGS. 6, 7, and 9, flanges 22 and 23 have inside horizontal grooves or slots 34 and 36 for accommodating the side flanges of coupler 11 to retain bumper 10 on coupler 11. Opposite ends of grooves 34 and 36 are open to allow bumper 10 to be placed on coupler 11. The side flange of coupler 11 fits in grooves 34 and 36 and extends past the forward ends of flanges 22 and 23. The front flange or lip of coupler 11 is located under body portion 18. The bottom of the front flanges of coupler 11 is not covered with a bumper or flange. This prevents bumper material from being pushed into the coupler pocket when attempting to connect coupler 11 to the hitch ball 20.

As shown in FIGS. 1, 3, 6 and 8, a first boot 38 joined to side portion 19 of body 17 has a generally rectangular pocket 38 with a bottom opening 41. Pocket 39 has a size and shape for storing a generally parallelepiped shaped trailer light and brake plug (not shown). The boot 38 can be positioned in different locations on body 11. The light plug is inserted through bottom opening 41 into pocket 39. The walls of boot 38 engage the plug to retain the plug in pocket 39. A second boot 42 attached to side portion 21 of body 17 has a cylindrical pocket 43 with a bottom opening 44. Pocket 43 has a size and shape to store a cylindrical RV electric light and brake plug or connector (not shown).

The bumper 10 is preferably manufactured as a one-piece member utilizing an injection molding process. A preferred material of construction is a polyurethane, such as a thermoplastic polyurethane. In a preferred embodiment, the bumper 10 is manufactured at least in part from polyurethane. It is recognized that other polymeric materials and methods of manufacture could be utilized to produce bumper 10 and still be within the scope of the present invention. For example, the bumper 10 could be fabricated from standard plastic or rubber stock, and formed either by the manufacturer or customer. Alternatively, a form could be utilized to build layers onto, in a dip molding process, utilizing such materials as vinyl plastisol. Thermoplastic elastomers and natural or synthetic rubber compounds could be utilized. The bumper 10 could also be free-poured into a casting utilizing a two-part polyurethane and an open mold. The selection of a high-pressure molding process in conjunction with a polyurethane is preferred based on the performance of the part and the cost of manufacture.

A first modification of the bumper, indicated generally at 100, is shown in FIGS. 11 to 20. The parts of bumper 100 that correspond to the parts of bumper 10 have the same reference numbers with the prefix 1. Bumper 100 has one boot 138 joined to side portion 122 of body 117. Boot 138 has a generally rectangular pocket 139 for accommodating a flat electrical plug or connector. The function and advantage of bumper 100 are identical to bumper 10 except for the second boot.

A second modification of the bumper, indicated generally at 200, is shown in FIGS. 21 to 30. The parts of bumper 200 that correspond to the parts of bumper 10 have the same reference numbers with the prefix 2. Body 217 has side portions 219 and 221 that are not joined to boots for accommodating electrical plugs or connectors. Bumper 200 has laterally symmetrical structures and appearance.

New characteristics and advantages of the invention have been set forth in the foregoing description. It will be understood, however, that this disclosure is only illustrative. Changes may be made in details, particularly in matters of scope, size and arrangement of parts, without exceeding the scope of the invention. The invention is defined in appended claims.

What is claimed is:

1. A bumper for a trailer coupler having a housing with a generally quad-shaped front end for accommodating a ball hitch and outwardly directed longitudinal side flanges comprising: a body having opposite sides and an inside wall having a size and shape to fit on the quad-shaped front end of the housing, longitudinal members joined to the opposite sides of the body, said members having longitudinal grooves for accommodating the side flanges of the housing, and strap means secured to rear portions of the longitudinal members to retain the body on the housing.

2. The bumper of claim 1 wherein: the body, longitudinal members and strap means are a one-piece flexible plastic article.

3. The bumper of claim 1 wherein: the body has opposite side portions joined to the longitudinal members, said side portions having rearward inwardly tapering inside walls adapted to engage opposite sides of the housing.

4. The bumper of claim 1 wherein: said inside walls include inwardly open recesses for accommodating rivet heads projected outwardly from the housing.

5. The bumper of claim 1 wherein: the strap means is a linear elastic band joined to rear portions of the longitudinal members.

6. The bumper of claim 1 wherein: the body has a front portion located forwardly of the front end of the housing when located on the housing.

7. The bumper of claim 1 including: a first boot having a first pocket for an electric plug joined to the body and a second boot having a second pocket for an electric plug joined to the body.

8. The bumper of claim 1 including: a boot having a pocket for an electric plug joined to the body.

9. The bumper of claim 1 wherein: the body has opposite side portions, a first boot joined to one side portion and a second boot joined to the other side portion, each boot having a pocket for accommodating an electric plug.

10. The bumper of claim 1 wherein: the body has opposite side portions, and a boot joined to one side wall, said boot having a pocket for accommodating an electrical plug.

11. The bumper of claim 1 wherein: the entire bumper is an elastomeric member.

12. The bumper of claim 1 wherein: the bumper is a one-piece pliant member which includes urethane.

13. A bumper for a trailer coupler having a housing with a convex curved front end for accommodating a ball hitch and lateral outwardly directed side flanges comprising: a body having opposite side portions and an inside wall having a size and shape to fit on the convex curved front end of the housing, said side portions having rear portions and inwardly open grooves for accommodating the side flanges of the housing, and means joined to the rear portions of the side portions of the body to retain the side portions of the body adjacent the housing and on the housing.

14. The bumper of claim 13 wherein: the body is a one-piece flexible plastic member.

15. The bumper of claim 13 wherein: the side portions of the body have rearward inwardly tapering inside walls adapted to engage opposite sides of the housing.

16. The bumper of claim 15 wherein: the inside walls include inwardly open recesses for accommodating projections on the housing.

17. The bumper of claim 13 wherein: the means joined to the rear portions of the side portions of the body comprises a transverse elastic strap.

18. The bumper of claim 13 wherein: the body has a front portion located forwardly of the front end of the housing when located on the housing.

19. The bumper of claim 13 including: a first boot having a first pocket for an electric plug joined to the body and a second boot having a second pocket for an electric plug joined to the body.

20. The bumper of claim 13 including: a boot having a pocket for an electric plug joined to the body.

21. The bumper of claim 13 including: a first boot joined to one side portion and a second boot joined to the other side portion, each boot having a pocket for accommodating an electric plug.

22. The bumper of claim 13 including: a boot joined to one side wall, said boot having a pocket for accommodating an electrical plug.

23. The bumper of claim 13 wherein: the entire bumper is an elastomeric member.

24. The bumper of claim 13 wherein: the bumper is a one-piece pliant member which includes urethane.

* * * * *